United States Patent Office 2,816,835
Patented Dec. 17, 1957

2,816,835
DE-BITTERING OF CITRUS FRUITS

Louis B. Rockland, Pasadena, Elmer A. Beavens, Alhambra, and Joseph Clyde Underwood, Altadena, Calif., assignors to the United States of America as represented by the Secretary of Agriculture No Drawing. Application April 8, 1955,
Serial No. 500,309

5 Claims. (Cl. 99—103)

(Granted under Title 35, U. S. Code (1952), sec. 266)

A non-exclusive, irrevocable royalty-free license in the invention herein described, for all governmental purposes, throughout the world, with the power to grant sub-licenses for such purposes, is hereby granted to the Government of the United States of America.

This invention relates to and has as its prime object the provision of processes for treating fresh citrus fruit whereby to improve the taste of the fruit particularly by reducing its content of bitter principles. A specific object of the invention is the provision of techniques whereby preserved citrus products of stable taste quality can be prepared from fresh citrus fruit which normally would be unfit for such purposes because of being too bitter to begin with or because of developing bitterness on processing or after storage in the preserved state. Further objects and advantages of the invention will be obvious from the description herein.

It is well known that most citrus fruits contain bitter principles, the amount thereof varying among the different species and varieties. Navel oranges are particularly high in content of these undesirable taste factors. In general at the beginning of the navel season the fruit is highly bitter and as the season progresses the fruit becomes less bitter. However, even later season fruit contains so much bitterness or bitterness-producing precursors that the fruit simply cannot be used for processing purposes, for example, preparation of single-strength or concentrated juice, because on standing a strong, undesirable bitter flavor is produced in the juice. This problem of bitterness has long be recognized in the industry and has restricted the use of navel oranges to sale for fresh fruit consumption. No market exists for undersized or otherwise cull navels and generally the peels of these are treated for recovery of pectin, the extracted juice being simply discarded. Grapefruit, especially those grown in California, are also high in content of bitter principles so that this fruit is suitable only for consumption as fresh fruit but not for processing.

It has now been found that the content of bitter principles and bitterness-producing precursors in citrus fruit can be drastically reduced by subjecting the fresh fruit to what may be termed an accelerated maturation process. In essence the process involves subjecting the fruit to an environment which is warm and moist whereby metabolic processes which result in disappearance of bitter principles or precursors of such principles are speeded up without causing a shriveling or drying out of the fruit. Generally the process is carried out by placing the fruit packed in crates or other gas-permeable containers into storage rooms wherein the air is maintained at a temperature from about 80° to about 90° F. and the relative humidity is maintained at about 75 to about 90%. The fruit is left in such an environment until it has developed a desired level of freedom from bitterness. The time of residence in storage will depend on various factors. For example, the temperature of storage is a factor since a higher temperature is more conducive to rapid elimination of bitterness. Other factors are the species and variety of the fruit, the season when the fruit was harvested, the original content of bitter principles and precursors in the fruit, the ultimate use intended for the fruit, etc. In carrying out the process of the invention, the operator may judge the time required for storage by simply withdrawing samples of the fruit at intervals and noting the taste of the fresh fruit. A more rigorous test is to squeeze some of the juice out of the fruit and warm it up to almost boiling then cool it before tasting. Such a heat treatment intensifies the bitterness in the juice by converting bitterness-producing precursors into bitter principles. One might say that the heat treatment "brings out the worst in the juice." Generally storage times at the above described conditions for about 7 to 20 days will render the fruit essentially free from bitterness and useful for preparing processed products.

After the fresh fruit is removed from the controlled storage treatment as described above, it may be utilized for divers purposes. For example, the treated fruit may be sold for direct consumption as fresh fruit. More important, since the fruit is now essentially free from bitter principles and bitter principle precursors, it may be processed to prepare any type of preserved product. Such products will not develop bitterness during processing nor on storage but will retain a non-bitter, desirable flavor. Some examples of preservation techniques which may be applied are as follows:

The juice may be extracted from the treated fruit and bottled and kept under cold storage refrigeration conditions for sale as fresh, single-strength juice. The juice from the treated fruit may be processed into concentrated, frozen citrus juice. To this end the juice is concentrated under vacuum to produce a 6-fold concentrate. This concentrate is then cut back to a 4-fold level with single-strength juice (to restore aromatic principles lost during evaporation). This flavor-restored concentrate is then packaged in cans or other suitable containers, frozen and maintained in frozen storage until used. Instead of restoring flavor with single-strength juice, citrus peel oil may be used, e. g., orange peel oil in the case of preparing orange juice concentrate. This has the benefit that so little of the oil need be used that no dilution of the concentrate occurs. Thus in this process the fresh juice is vacuum evaporated to a 4-fold level, the required small amount of orange peel oil added and the product packaged and frozen. Canned products may also be made from the single-strength or concentrated juice by applying customary canning techniques which involve sealing the liquid in cans and subjecting the canned liquid to heat sufficient to sterilize the product. Juice from the treated fruit can also be used to prepare solid dehydrated products by the application of such procedures as vacuum drying or spray drying. It is evident that other preservative treatments as well known in the art can be applied to the juice from the treated fruit.

In some cases it is desirable to apply a fungicide to the fruit prior to initiation of the storage treatment to minimize molding of the fruit. To this end the fruit may be dipped in a solution of a fungicide as for example sorbic acid, borax, dehydroacetic acid, and so forth. Instead of using a dipping technique, the fungicidal solution may be applied to the fruit by the use of sprays, rotating brushes or other conventional coating devices.

It must be realized that fresh fruit is a living organism at least in the sense that certain vital processes such as respiration continue after severance of the fruit from the plant. The treatment in accordance with this invention depends on the fruit continuing in such a living state and metabolizing at an accelerated pace. To preserve the fruit in a vital and healthy condition during the storage period it is often desirable to apply a plant growth stimulant (auxin) to the fruit. Such compounds can be applied by coating the fruit with a solution of the stimulant or better, by impregnating a blotter or piece of cardboard with a volatile plant growth stimulant and placing the impregnated unit in a container with the fruit. During the storage period, the atmosphere about the fruit will then contain minute but effective amounts of the plant stimulants. Many compounds effective for stimulating plant growth are known and described in the literature and may be used for the purpose of this invention. Examples of suitable materials are listed below merely by way of illustration:

2,4-dichlorophenoxyacetic acid, the salts, esters, and amides of this acid.
Maleic hydrazide.
Naphthalene acetic acid, its salts, esters, or amides.
Indole acetic acid, its salts, esters, or amide.
2,4,5-trichlorophenoxyacetic acid, its salts, esters, or amide.

The invention is further illustrated by the following example.

Navel oranges were harvested from a California orchard early in the season (January). The fruit, packed in cardboard boxes, was placed in a storage room having an atmosphere maintained at 85° F., 85% relative humidity. The original oranges and samples of the oranges stored for 7 days and 14 days were subjected to physical and chemical tests. In addition the juice from each sample was tasted by a panel of trained food tasters. The taste of the juice was scored on a hedonic scale giving a score of zero for no bitterness and 4 for extreme bitterness.

The results obtained are tabulated below:

| Storage time, days | Flavor of juice | Sugar content of juice, °Brix | Acid content of juice, as citric, percent | Ratio of Brix to acid content |
|---|---|---|---|---|
| 0 (control) | 4 | 13.1 | 1.22 | 10.7 |
| 7 | 2 | 12.9 | 0.97 | 13.3 |
| 14 | 0 | 13.4 | 0.92 | 14.5 |

It is evident from the above data that by storing the fruit for 14 days at 85° F. and 85% relative humidity, the fruit was rendered free from bitterness. Further, the fruit became markedly sweeter as indicated by the rise in the Brix/acid ratio.

In addition it was observed that the fruit stored for 7 days and 14 had a plump and natural appearance being completely free from signs of drying or shriveling. The fruit stored 7 days showed 90% green buttons and the fruit stored 14 days had 70% green buttons the percentage of green buttons is an accepted index of fruit quality, the higher the percent the better the quality.

It was also found that the stored fruit exhibited no change in weight nor change in juice yield.

As a further test of the efficacy of the process, oranges were harvested from the same orchard 30 days after the previous harvesting. These oranges were found to be bitter. It is thus evident that storage under the controlled conditions of temperature and humidity for 14 days removed bitterness whereas normal maturation on the tree for 30 days did not remove bitterness.

Having thus described the invention what is claimed is:

1. A process for preparing a preserved citrus product from fresh citrus fruit which would normally be unsuited for such use because of excessive bitterness which comprises storing such fresh fruit in an atmosphere maintained at a relative humidity from about 75 to 90% and at a temperature from about 80 to about 90° F. for a period of 7 to 20 days to render the fruit essentially free from bitterness, extracting the juice from the fruit and subjecting the juice to a preservation treatment.

2. The process of claim 1 wherein the preservation treatment includes storing under refrigeration.

3. The process of claim 1 wherein the preservation treatment includes concentration and freezing.

4. The process of claim 1 wherein the preservation treatment includes canning.

5. The process of claim 1 wherein the preservation treatment includes dehydration to a solid state.

References Cited in the file of this patent

"Citrus Products," by J. B. S. Braverman, published 1949 by Interscience Publishers, Inc., New York, pages 34 to 40, 276, 277, 283, 290 to 294.